United States Patent
Saito et al.

(10) Patent No.: US 11,142,663 B2
(45) Date of Patent: *Oct. 12, 2021

(54) UV-CURABLE INK JET INK COMPOSITION

(71) Applicant: Seiko Epson Corporation, Tokyo (JP)

(72) Inventors: Toru Saito, Yamagata (JP); Naoki Koike, Matsumoto (JP); Toshiyuki Yoda, Matsumoto (JP); Kiyoshi Nakamura, Matsumoto (JP)

(73) Assignee: Seiko Epson Corporation

( * ) Notice: Subject to any disclaimer, the term of this patent is extended or adjusted under 35 U.S.C. 154(b) by 0 days.

This patent is subject to a terminal disclaimer.

(21) Appl. No.: 16/801,281

(22) Filed: Feb. 26, 2020

(65) Prior Publication Data
US 2020/0270472 A1 Aug. 27, 2020

(30) Foreign Application Priority Data

Feb. 27, 2019 (JP) ............... JP2019-034523

(51) Int. Cl.
*C09D 11/38* (2014.01)
*C09D 11/107* (2014.01)
*B41J 11/00* (2006.01)
*B41M 5/00* (2006.01)
*C09D 11/101* (2014.01)

(52) U.S. Cl.
CPC ............ *C09D 11/38* (2013.01); *B41J 11/002* (2013.01); *B41M 5/0023* (2013.01); *C09D 11/101* (2013.01); *C09D 11/107* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 2/04588; B41J 2/04595; B41J 2/04586; B41J 2/14274; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033

See application file for complete search history.

(56) References Cited

U.S. PATENT DOCUMENTS

| | | | |
|---|---|---|---|
| 5,840,806 A | 11/1998 | Komazaki et al. | |
| 9,458,333 B2 | 10/2016 | Hall et al. | |
| 9,469,771 B2 | 10/2016 | Mizutaki et al. | |
| 10,323,155 B2 | 6/2019 | Toeda et al. | |
| 2006/0128823 A1 | 6/2006 | Tsuchimura et al. | |
| 2006/0160917 A1 | 7/2006 | Oyanagi et al. | |
| 2007/0211111 A1 | 9/2007 | Hayata | |
| 2012/0029108 A1* | 2/2012 | Nakane ............... | B41J 11/0015 522/26 |
| 2012/0208915 A1 | 8/2012 | Hayata et al. | |
| 2012/0274717 A1* | 11/2012 | Nakano ................. | B41J 2/2107 347/102 |
| 2013/0030076 A1* | 1/2013 | Weinmann ........... | C08K 5/0025 522/31 |
| 2014/0232790 A1* | 8/2014 | Makuta ................ | B41M 5/0047 347/47 |
| 2015/0091974 A1 | 4/2015 | Aoyama et al. | |
| 2015/0315396 A1 | 11/2015 | Kida et al. | |
| 2017/0233594 A1 | 8/2017 | Yoda et al. | |
| 2018/0072845 A1* | 3/2018 | Zhou .................... | C09D 11/102 |
| 2018/0194955 A1* | 7/2018 | Zhou .................... | C09D 11/101 |
| 2018/0223117 A1* | 8/2018 | Toeda .................... | C09D 11/38 |

FOREIGN PATENT DOCUMENTS

| | | |
|---|---|---|
| JP | 2006-249155 A | 9/2006 |
| JP | 2006-274025 A | 10/2006 |
| JP | 2009-197194 A | 9/2009 |
| JP | 2012-007107 A | 1/2012 |
| JP | 2012-031254 A | 2/2012 |
| JP | 2012-207199 A | 10/2012 |
| JP | 2013-203873 A | 10/2013 |
| JP | 2016-006179 | 1/2016 |
| JP | 2018-127527 A | 8/2018 |

* cited by examiner

*Primary Examiner* — Manish S Shah
(74) *Attorney, Agent, or Firm* — Harness, Dickey & Pierce, P.L.C.

(57) ABSTRACT

A UV-curable ink jet ink composition includes: 10.00% by mass or more and 60.00% by mass or less, relative to a total mass of the ink composition, of a compound represented by formula (A); 10.00% by mass or more and 50.00% by mass or less, relative to the total mass of the ink composition, of one or more monofunctional monomers having an alicyclic hydrocarbon group or a cyclic ether group; 0.05% by mass or more and 0.50% by mass or less, relative to the total mass of the ink composition, of one or more fluorescent brighteners including a compound represented by formula (b1), (b2), (b3), or (b4); and 3.00% by mass or more and 8.00% by mass or less, relative to the total mass of the ink composition, of one or more acylphosphine oxide polymerization initiators.

10 Claims, No Drawings

UV-CURABLE INK JET INK COMPOSITION

The present application is based on, and claims priority from JP Application Serial Number 2019-034523, filed Feb. 27, 2019, the disclosure of which is hereby incorporated by reference herein in its entirety.

BACKGROUND

1. Technical Field

The present disclosure relates to a UV-curable ink jet ink composition used for an ink jet recording method.

2. Related Art

An ink jet recording method enables recording of high-resolution images by using a relatively simple apparatus and thus have been rapidly developing in various fields. In recent years, there is a need for applying an ink jet recording method to commercial uses. Under such circumstances, a UV-curable ink jet ink composition has been proposed.

For example, JP-A-2006-249155 describes an ink composition that can cure highly sensitively to irradiation and form high-quality images with excellent adhesion to recording media, where the ink composition is characterized by including a sensitizer dye having a specific skeleton, polymerizable compounds, and a polymerization initiator.

A UV-curable ink jet ink composition is desirably cured at an irradiation intensity as low as possible for a short irradiation time in the UV irradiation step. Accordingly, excellent curing properties are required for such an ink composition. Meanwhile, when a fluorescent brightener is added to improve curing properties of an ink composition, there is a problem in which bleeding out as solid matter is observed after curing depending on the type and/or the amount of the added fluorescent brightener.

The present inventors conducted intensive studies to resolve the above-mentioned problem and, as a result, found that a UV-curable ink jet ink composition that resolves the above-mentioned problem can be obtained by combining: a predetermined amount of a compound of formula (A); a predetermined amount of a monofunctional monomer having an alicyclic hydrocarbon group or a cyclic ether group; a predetermined amount of one or more fluorescent brighteners including a selected compound; and a predetermined amount of an acylphosphine oxide polymerization initiator.

SUMMARY

Specifically, the present disclosure relates to a UV-curable ink jet ink composition including: 10.00% by mass or more and 60.00% by mass or less, relative to a total mass of the ink composition, of a compound represented by the following formula (A): $CH_2=CR^1-COOR^2-O-CH=CH-R^3$ where $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms; 10.00% by mass or more and 50.00% by mass or less, relative to the total mass of the ink composition, of one or more monofunctional monomers having an alicyclic hydrocarbon group or a cyclic ether group; 0.05% by mass or more and 0.50% by mass or less, relative to the total mass of the ink composition, of one or more fluorescent brighteners including a compound represented by the following formula (b1), (b2), (b3), or (b4);

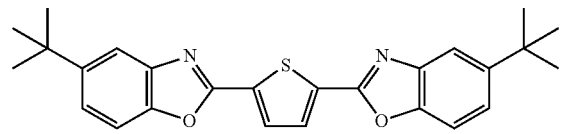
(b1)

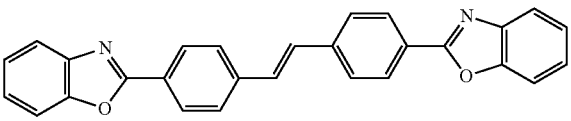
(b2)

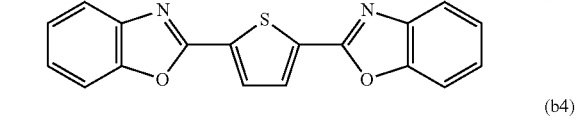
(b3)

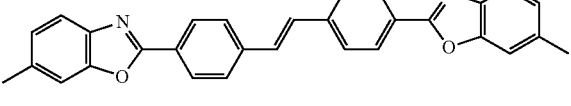
(b4)

and 3.00% by mass or more and 8.00% by mass or less, relative to the total mass of the ink composition, of one or more acylphosphine oxide polymerization initiators.

The monofunctional monomers having an alicyclic hydrocarbon group or a cyclic ether group may include isobornyl acrylate, tetrahydrofurfuryl acrylate, cyclic trimethylolpropane formal acrylate, or 3,3,5-trimethylcyclohexyl acrylate.

The UV-curable ink jet ink composition may further include: 10.00% by mass or more and 40.00% by mass or less, relative to the total mass of the ink composition, of a monomer having a hydroxy group.

The fluorescent brighteners may include a compound represented by the formula (b1) or (b2) and further preferably a compound represented by the formula (b1).

The acylphosphine oxide polymerization initiators may include a bisacylphosphine oxide polymerization initiator.

The UV-curable ink jet ink composition may further include: 3.00 to 10.00% by mass, relative to the total mass of the ink composition, of a urethane acrylate oligomer.

The UV-curable ink jet ink composition may further include a colored colorant.

The UV-curable ink jet ink composition may further include a sensitizer having a molecular weight of 700 or more.

Further, the present disclosure also relates to an ink jet recording method including: a discharge step of discharging the UV-curable ink jet ink composition onto a recording medium from a head; and a curing step of curing the UV-curable ink jet ink composition attached to the recording medium by irradiating with UV from a UV light-emitting diode having a peak wavelength within a range of 360 nm or more and 420 nm or less.

DESCRIPTION OF EXEMPLARY EMBODIMENTS

Hereinafter, embodiments of the present disclosure (hereinafter, referred to as "embodiments") will be described in detail. The present disclosure, however, is not limited to these embodiments, and various modifications are possible without departing from the spirit of the present disclosure.

UV-Curable Ink Jet Ink Composition

A UV-curable ink jet ink composition according to an embodiment (hereinafter, also simply referred to as "ink composition") includes: 10.00% by mass or more and 60.00% by mass or less, relative to a total mass of the ink composition, of a compound represented by formula (A) (hereinafter, also simply referred to as "compound (A1)"); 10.00% by mass or more and 50.00% by mass or less, relative to the total mass of the ink composition, of one or more monofunctional monomers having an alicyclic hydrocarbon group or a cyclic ether group (hereinafter, also simply referred to as "cyclic monofunctional monomers (A2)"); 0.05% by mass or more and 0.50% by mass or less, relative to the total mass of the ink composition, of one or more fluorescent brighteners (hereinafter, also simply referred to as "fluorescent brighteners") including a compound represented by formula (b1), (b2), (b3), or (b4) (hereinafter, a compound represented by formula (b1) is also simply referred to as "compound (b1)", a compound represented by formula (b2) as "compound (b2)", a compound represented by formula (b3) as "compound (b3)", and a compound represented by formula (b4) as "compound (b4)"); and 3.00% by mass or more and 8.00% by mass or less, relative to the total mass of the ink composition, of one or more acylphosphine oxide polymerization initiators.

According to the above constitution, the ink composition exhibits excellent curing properties and suppressed bleeding out after curing. Further, the ink composition of the embodiment exhibits a low viscosity suitable for ink jet printing as well as excellent stretch resistance and solubility of polymerization initiators.

Herein, various terms are defined as follows.

The term "UV-curable ink jet ink composition" means an ink composition employed for uses to obtain a cured film through actinic irradiation of the ink composition that has been attached to a recording medium by an ink jet recording method.

The term "(meth)acrylate" means an acrylate or a methacrylate. Similarly, the term "(meth)acryloyl group" means an acryloyl group or a methacryloyl group. In the same manner, the term "(meth)acrylic acid" means acrylic acid or methacrylic acid.

Compounds (A1)

The ink composition of the embodiment includes 10.00% by mass or more and 60.00% by mass or less, relative to the total mass of the ink composition, of a compound (A1) represented by the following formula (A):

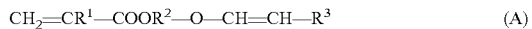

$$CH_2=CR^1—COOR^2—O—CH=CH—R^3 \quad (A)$$

where $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms. By including a compound (A1) within the above-mentioned range, it is possible to obtain a low-viscosity ink composition and suppress bleeding out after curing. By including 60.00% by mass or less of a compound (A1), the composition after curing exhibits excellent stretch resistance.

In formula (A), $R^1$ is preferably a hydrogen atom.

In formula (A), examples of the divalent organic residue of $R^2$ include a linear, branched, or cyclic alkylene group having 2 to 20 carbon atoms; an alkylene group having an oxygen atom of an ether linkage or an ester linkage in the structure having 2 to 20 carbon atoms; and a divalent aromatic group having 6 to 11 carbon atoms. These alkylene groups and the divalent aromatic group may be substituted.

Examples of the linear, branched, or cyclic alkylene group include, but not particularly limited to, an ethylene group, an n-propylene group, an isopropylene group, and a butylene group.

Examples of the alkylene group having an ether linkage or an ester linkage in the structure include, but not particularly limited to, an oxyethylene group, an oxy-n-propylene group, an oxyisopropylene group, an oxybutylene group, and an ethyleneoxyethylene group ($—CH_2CH_2OCH_2CH_2—$).

$R^2$ is preferably an alkylene group having 2 to 6 carbon atoms or an alkylene group having 2 to 9 carbon atoms and an oxygen atom of an ether linkage in the structure.

In formula (A), examples of the monovalent organic residue $R^3$ having 1 to 11 carbon atoms include a linear, branched, or cyclic alkyl group having 1 to 10 carbon atoms and a monovalent aromatic group having 6 to 11 carbon atoms. The alkyl group and the monovalent aromatic group may be substituted.

Examples of the alkyl group include, but not particularly limited to, a methyl group and an ethyl group.

Examples of the aromatic group include, but not particularly limited to, a phenyl group and a benzyl group.

$R^3$ is preferably a hydrogen atom, an alkyl group having 1 or 2 carbon atoms, or a monovalent aromatic group having 6 to 8 carbon atoms; more preferably a hydrogen atom, a methyl group, an ethyl group, a phenyl group, or a benzyl group; and further preferably a hydrogen atom.

When each of the above-mentioned organic residues is substituted with a group containing one or more carbon atoms, such carbon atoms are counted into the carbon number of the respective organic residues.

Examples of substituents include, but not particularly limited to, a carboxy group, an alkoxy group having 1 to 3 carbon atoms, a hydroxy group, and a halo group.

Specific examples of the compound (A1) include, but not particularly limited to, 2-(vinyloxy)ethyl (meth)acrylate, 3-(vinyloxy)propyl (meth)acrylate, 1-methyl-2-(vinyloxy)ethyl (meth)acrylate, 2-(vinyloxy)propyl (meth)acrylate, 4-(vinyloxy)butyl (meth)acrylate, 1-methyl-3-(vinyloxy)propyl (meth)acrylate, 1-(vinyloxymethyl)propyl (meth)acrylate, 2-methyl-3-(vinyloxy)propyl (meth)acrylate, 1,1-dimethyl-2-(vinyloxy)ethyl (meth)acrylate, 3-(vinyloxy)butyl (meth)acrylate, 1-methyl-2-(vinyloxy)propyl (meth)acrylate, 2-(vinyloxy)butyl (meth)acrylate, 4-(vinyloxy)cyclohexyl (meth)acrylate, 6-(vinyloxy)hexyl (meth)acrylate, 4-(vinyloxymethyl)cyclohexylmethyl (meth)acrylate, 3-(vinyloxymethyl)cyclohexylmethyl (meth)acrylate, 2-(vinyloxymethyl)cyclohexylmethyl (meth)acrylate, p-(vinyloxymethyl)phenylmethyl (meth)acrylate, m-(vinyloxymethyl)phenylmethyl (meth)acrylate, o-(vinyloxymethyl)phenylmethyl (meth)acrylate, 2-(vinyloxyethoxy)ethyl (meth)acrylate, 2-(vinyloxyisopropoxy) ethyl (meth)acrylate, 2-(vinyloxyethoxy) propyl (meth)acrylate, 2-(vinyloxyethoxy) isopropyl (meth)acrylate, 2-(vinyloxyisopropoxy) propyl (meth)acrylate, 2-(vinyloxyisopropoxy) isopropyl (meth)acrylate, 2-(vinyloxyethoxyethoxy) ethyl (meth)acrylate, 2-(vinyloxyethoxyisopropoxy) ethyl (meth)acrylate, 2-(vinyloxyisopropoxyethoxy) ethyl (meth)acrylate, 2-(vinyloxyisopropoxyisopropoxy)ethyl (meth)acrylate, 2-(vinyloxyethoxyethoxy) propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy) isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethylene glycol monovinyl ether (meth)acrylate, and polypropylene glycol monovinyl ether (meth)acrylate.

Among these compounds, 2-(vinyloxy)ethyl (meth)acrylate, 3-(vinyloxy)propyl (meth)acrylate, 1-methyl-2-(vinyloxy)ethyl (meth)acrylate, 2-(vinyloxy)propyl (meth)acrylate, 4-(vinyloxy)butyl (meth)acrylate, 4-(vinyloxy)cyclohexyl (meth)acrylate, 5-(vinyloxy)pentyl (meth)acrylate, 6-(vinyloxy)hexyl (meth)acrylate, 4-(vinyloxymethyl) cyclohexylmethyl (meth)acrylate, p-(vinyloxymethyl)phenylmethyl (meth) acrylate, 2-(vinyloxyethoxy) ethyl (meth) acrylate, 2-(vinyloxyethoxyethoxy) ethyl (meth)acrylate, or 2-(vinyloxyethoxyethoxy) ethyl (meth)acrylate is preferable.

Among these compounds, due to low viscosity, high flash point, and excellent curing properties, 2-(vinyloxyethoxy) ethyl (meth)acrylate is more preferable, and 2-(vinyloxyethoxy)ethyl acrylate is further preferable. Here, 2-(vinyloxyethoxy)ethyl methacrylate encompasses 2-[2-(vinyloxy)ethoxy]ethyl methacrylate and 2-[1-(vinyloxy)ethoxy]ethyl methacrylate, whereas 2-(vinyloxyethoxy) ethyl acrylate encompasses 2-[2-(vinyloxy)ethoxy]ethyl acrylate and 2-[1-(vinyloxy)ethoxy]ethyl acrylate.

These compounds (A1) may be used alone or in combination.

In the ink composition of the embodiment, the content of the compound (A1) is 10.00% by mass or more and 60.00% by mass or less, preferably 10.00% by mass or more and 55.00% by mass or less, more preferably 15.00% by mass or more and 51.00% by mass or less, further preferably 20.00% by mass or more and 49.00% by mass or less, and still further preferably 30.00% by mass or more and 45.00% by mass or less, relative to the total mass of the ink composition. When the content of the compound (A1) falls within the above-mentioned ranges, it is possible to further lower the viscosity of the ink composition and to suppress bleeding out after curing. In particular, when the content is 60.00% by mass or less, stretch resistance can be remarkably enhanced.

The compound (A1) is obtained by a publicly known method. Examples of the production method includes, but not particularly limited to, a method of esterifying (meth)acrylic acid, a (meth)acryloyl halide, or (meth)acrylic anhydride with hydroxy group-containing vinyl ethers.

Cyclic Monofunctional Monomers (A2)

The ink composition of the embodiment includes 10.00% by mass or more and 50.00% by mass or less, relative to the total mass of the ink composition, of one or more monofunctional monomers having an alicyclic hydrocarbon group or a cyclic ether group. By including a cyclic monofunctional monomer (A2) or by controlling the content to 10.00% by mass or more, adhesion and stretch resistance of the ink composition can be enhanced. Moreover, by controlling the content of a cyclic monofunctional monomer (A2) to 50.00% by mass or less, it is possible to remarkably enhance adhesion of the ink composition after curing as well as to improve solubility of polymerization initiators, curing properties, and low viscosity characteristics of the ink composition.

The cyclic monofunctional monomer (A2) has one polymerizable functional group. Examples of the polymerizable functional group include, but not particularly limited to, a (meth)acryloyl group and a vinyl group.

The cyclic monofunctional monomer (A2) is preferably a monofunctional monomer having an alicyclic hydrocarbon group or a cyclic ether group that has 6 to 20 carbon atoms.

Examples of the monofunctional monomer having an alicyclic hydrocarbon group include, but not particularly limited to, isobornyl (meth)acrylate, cyclohexyl (meth)acrylate, 3,3,5-trimethylcyclohexyl (meth)acrylate, tert-butylcyclohexyl (meth) acrylate, dicyclopentenyl (meth) acrylate, dicyclopentenyloxyethyl (meth) acrylate, dicyclopentanyl (meth) acrylate, dicyclopentanyloxyethyl (meth) acrylate, adamantyl (meth) acrylate, 2-methyl-2-adamantyl (meth)acrylate, 2-ethyl-2-adamantyl (meth)acrylate, 2-isopropyl-2-adamantyl (meth)acrylate, and 1-(1-adamantyl)-1-methylethyl (meth)acrylate.

Examples of the monofunctional monomer having a cyclic ether group include, but not particularly limited to, tetrahydrofurfuryl (meth)acrylate and cyclic trimethylolpropane formal (meth)acrylate.

These cyclic monofunctional monomers (A2) may be used alone or in combination.

Among these cyclic monofunctional monomers (A2), isobornyl (meth) acrylate, 3,3,5-trimethylcyclohexyl (meth) acrylate, tetrahydrofurfuryl (meth)acrylate, or cyclic trimethylolpropane formal (meth)acrylate is preferable, and isobornyl acrylate, 3,3,5-trimethylcyclohexyl acrylate, tetrahydrofurfuryl acrylate, or cyclic trimethylolpropane formal acrylate is more preferable.

In the ink composition of the embodiment, the content of the cyclic monofunctional monomer (A2) is 10.00% by mass or more and 50.00% by mass or less, preferably 20.00% by mass or more and 45.00% by mass or less, and more preferably 30.00% by mass or more and 40.00% by mass or less, relative to the total mass of the ink composition. When the content falls within the above-mentioned ranges, adhesion of the ink composition can be enhanced further. In particular, by controlling the content to 50.00% by mass or less, it is possible to further lower the viscosity and further improve curing properties and solubility of polymerization initiators.

Hydroxy Group-Containing Monomers (A3)

The ink composition of the embodiment preferably includes a monomer having a hydroxy group (hereinafter, also referred to as "hydroxy group-containing monomer (A3)") and more preferably includes 5.00% by mass or more and 40.00% by mass or less, relative to the total mass of the ink composition, of a hydroxy group-containing monomer (A3). By controlling the content of the monomer having a hydroxy group within the above-mentioned range, particularly excellent curing properties are exhibited.

The monomer having a hydroxy group is preferably a non-aromatic monomer and more preferably a hydroxy group-containing alkyl (meth)acrylate.

Examples of the monomer having a hydroxy group include, but not particularly limited to, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, and 6-hydroxyhexyl (meth)acrylate.

When the ink composition of the embodiment includes a hydroxy group-containing monomer (A3), the content of the hydroxy group-containing monomer (A3) is preferably 5.00% by mass or more and 40.00% by mass or less, more preferably 10.00% by mass or more and 30.00% by mass or less, further preferably 13.00% by mass or more and 25.00% by mass or less, and still further preferably 15.00% by mass or more and 20.00% by mass or less, relative to the total mass of the ink composition. By including 10.00% by mass or more of the hydroxy group-containing monomer (A3), the ink composition can further enhance stretch resistance. Meanwhile, by including 40.00% by mass or less of the hydroxy group-containing monomer (A3), the ink composition can lower the viscosity and further improve curing properties and stretch resistance.

Urethane (Meth)acrylate Oligomers

The ink composition of the embodiment preferably includes a urethane (meth)acrylate oligomer and more preferably includes, relative to the total mass of the ink composition, 3.00% by mass or more and 10.00% by mass or less of a urethane (meth)acrylate oligomer. By including a urethane (meth)acrylate oligomer, the ink composition exhibits particularly excellent curing properties and adhesion.

The weight-average molecular weight of the urethane (meth)acrylate oligomer is preferably 350 or more and 30,000 or less. Here, the weight-average molecular weight can be determined as a weight-average molecular weight based on styrene by gel permeation chromatography (product name "L-7100 system" from Hitachi, Ltd., for example) using tetrahydrofuran as solvent.

The urethane (meth)acrylate oligomer is preferably a polyether-based urethane acrylate oligomer having a polyether backbone, a polyester-based urethane acrylate oligomer having a polyester backbone, or a polycarbonate-based urethane acrylate oligomer having a polycarbonate backbone.

The urethane (meth)acrylate oligomer may be an aromatic urethane (meth)acrylate oligomer or an aliphatic urethane (meth)acrylate oligomer. Among these oligomers, an aliphatic urethane (meth)acrylate oligomer is more preferable.

Examples of the urethane (meth)acrylate oligomer include, but not particularly limited to, a polyether-based aliphatic urethane (meth)acrylate oligomer, an alicyclic group-containing urethane (meth)acrylate oligomer, a polyester-based aromatic urethane (meth)acrylate oligomer, and a polyester-based aliphatic urethane (meth)acrylate oligomer.

Among these oligomers, a polyether-based aliphatic urethane (meth)acrylate oligomer is preferable.

Exemplary commercial products of the urethane (meth)acrylate oligomer include, but not particularly limited to, "CN 980" (functional group number of 2), "CN 996" (functional group number of 2), "CN 9893" (functional group number of 2), "CN 989" (functional group number of 3) (all product names for polyether-based aliphatic urethane acrylate oligomers from Sartomer); "CN 2920", "CN 9011" (both product names for alicyclic group-containing urethane acrylate oligomers from Sartomer); "CN 971" (functional group number of 3), "CN 972" (functional group number of 3), "CN 978" (functional group number of 2), "CN 9782" (functional group number of 2), "CN 9783" (functional group number of 2) (all product names for polyester-based aromatic urethane acrylate oligomers from Sartomer); "CN 929" (functional group number of 3), "CN 962" (functional group number of 2), "CN 963" (functional group number of 2), "CN 964" (functional group number of 2), "CN 965" (functional group number of 2), "CN 981" (functional group number of 2), "CN 982" (functional group number of 2), "CN 983" (functional group number of 2), "CN 9001" (functional group number of 2), "CN 9002" (functional group number of 2), "CN 9788" (functional group number of 2) (all product names for polyester-based aliphatic urethane acrylate oligomers from Sartomer); "CN 991" (functional group number of 2) (product name for a polyester-based alicyclic urethane acrylate oligomer from Sartomer); "Ebecryl" series "230" (functional group number of 2), "270" (functional group number of 2), "8311" (functional group number of 3), "8402" (functional group number of 2), "8701" (functional group number of 3), "8804" (functional group number of 2), "8807" (functional group number of 2), "9260" (functional group number of 3), "9270" (functional group number of 2); "KRM" series "8200" (functional group number of 6), "8296" (functional group number of 3), "8452" (functional group number of 10) (all product names for aliphatic urethane acrylate oligomers from Daicel-Allnex Ltd.); and "Ebecryl 210" (functional group number of 2) (product name for an aromatic urethane acrylate oligomer from Daicel-Allnex Ltd.).

When the ink composition of the embodiment includes a urethane (meth)acrylate oligomer, the content of the urethane (meth)acrylate oligomer is preferably 3.00% by mass or more and 10.00% by mass or less and more preferably 4.00% by mass or more and 8.00% by mass or less, relative to the total mass of the ink composition. By including a urethane (meth)acrylate oligomer within the above-mentioned ranges, curing properties and adhesion can be further improved.

Fluorescent Brighteners

The ink composition of the embodiment includes 0.05% by mass or more and 0.50% by mass or less, relative to the total mass of the ink composition, of one or more fluorescent brighteners including a compound represented by the following formula (b1), (b2), (b3), or (b4).

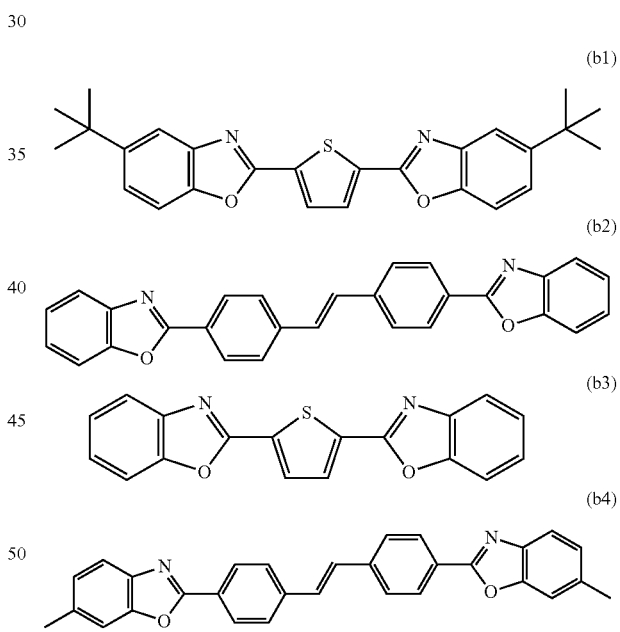

By including a predetermined amount of a fluorescent brightener, the ink composition of the embodiment exhibits particularly excellent curing properties. By selecting the above-mentioned compound (b1), compound (b2), compound (b3), or compound (b4) among various fluorescent brighteners and by combining with other components of the embodiment, curing properties can be remarkably improved while suppressing bleeding out after curing.

Among these compounds, compound (b1) or compound (b2) is preferable, and compound (b1) is more preferable.

Compound (b1), compound (b2), compound (b3), and compound (b4) can be synthesized by a publicly known method.

The content of a fluorescent brightener is 0.05% by mass or more and 0.50% by mass or less and preferably 0.10% by mass or more and 0.40% by mass or less, relative to the total mass of the ink composition. By including 0.05% by mass or more of a fluorescent brightener, curing properties can be improved. Meanwhile, by including 0.50% by mass or less of a fluorescent brightener, bleeding out after curing can be remarkably suppressed.

Acylphosphine Oxide Polymerization Initiators

The ink composition of the embodiment includes 3.00% by mass or more and 8.00% by mass or less, relative to the total mass of the ink composition, of an acylphosphine oxide polymerization initiator. By including an acylphosphine oxide polymerization initiator, the ink composition of the embodiment is more likely to have excellent curing properties of the composition and, in particular, further excellent curing properties in a curing process by a UV-LED. By controlling the content of an acylphosphine oxide polymerization initiator within the above-mentioned range, dissolution of the polymerization initiator in the ink composition becomes possible in addition to excellent curing properties.

The acylphosphine oxide polymerization initiator preferably has an aromatic ring to enhance solubility in the ink composition.

In addition, such acylphosphine oxide polymerization initiators preferably include a bisacylphosphine oxide polymerization initiator to enhance solubility in the ink composition.

The bisacylphosphine oxide polymerization initiator means a polymerization initiator of a phosphine oxide compound in which two acyl groups are bonded to the phosphorus atom.

Examples of the acylphosphine oxide polymerization initiator include, but not particularly limited to, bis(2,4,6-trimethylbenzoyl)phenylphosphine oxide, (2,4,6-trimethylbenzoyl)diphenylphosphine oxide, and bis(2,6-dimethoxybenzoyl) (2,4,4-trimethylpentyl)phosphine oxide. These acylphosphine oxide polymerization initiators may be used alone or in combination.

Among these polymerization initiators, bis(2,4,6-trimethylbenzoyl)phenylphosphine oxide and (2,4,6-trimethylbenzoyl)diphenylphosphine oxide are preferably used in combination since solubility of polymerization initiators in the ink composition and curing properties are remarkably improved.

Exemplary commercial products of the acylphosphine oxide polymerization initiator include "Irgacure 819" (product name for bis(2,4,6-trimethylbenzoyl)phenylphosphine oxide from BASF SE), "Irgacure TPO" (product name for (2,4,6-trimethylbenzoyl)diphenylphosphine oxide from BASF SE), and "Darocur TPO" (product name for (2,4,6-trimethylbenzoyl)diphenylphosphine oxide from BASF SE).

The content of the acylphosphine oxide polymerization initiator is 3.00% by mass or more and 8.00% by mass or less, preferably 3.50% by mass or more and 6.00% by mass or less, and more preferably 4.00% by mass or more and 5.00% by mass or less, relative to the total mass of the ink composition. By controlling the content of the acylphosphine oxide polymerization initiator within the above-mentioned ranges, the ink composition exhibits particularly excellent curing properties and solubility of the polymerization initiator.

The ink composition of the embodiment may include a polymerization initiator other than acylphosphine oxide polymerization initiators. Exemplary other polymerization initiators include alkylphenone polymerization initiators and titanocene-based polymerization initiators.

Sensitizers with Molecular Weight of 700 or More

The ink composition of the embodiment preferably includes a sensitizer with a molecular weight of 700 or more (hereinafter, also simply referred to as "sensitizer"). By including a sensitizer, the ink composition exhibits particularly remarkable curing properties.

The molecular weight of the sensitizer is preferably 720 or more and 3,000 or less and more preferably 750 or more and 2,000 or less.

The molecular weight is a theoretical molecular weight obtained from the chemical structure, and any sensitizer of a compound with a molecular weight within the above-mentioned ranges is encompassed in the sensitizer with a molecular weight of 700 or more.

Among sensitizers, thioxanthone-type sensitizers are preferable due to excellent safety, solubility in polymerizable compounds, and sensitizing effects on acylphosphine oxide polymerization initiators.

The thioxanthone-type sensitizer is not particularly limited provided that a compound has a thioxanthone skeleton, and examples include diester of polytetramethylene glycol with carboxymethoxythioxanthone.

Exemplary commercial products of the sensitizer include "Omnipol TX" [product name for diester of polytetramethylene glycol with carboxymethoxythioxanthone from IGM Resins B.V. (molecular weight: 790)], "SpeedCure 7010" (product name for a thioxanthone-type sensitizer with a molecular weight of 1,839 from Lambson Ltd.), "Kayacure DETX-S" (product name from Nippon Kayaku Co. Ltd.), "ITX" (from BASF SE), and "Quantacure CTX" (from Aceto Chemicals).

The content of the sensitizer is preferably 1.00% by mass or more and 10.00% by mass or less, more preferably 1.50% by mass or more and 5.00% by mass or less, and further preferably 2.00% by mass or more and 3.00% by mass or less, relative to the total mass of the ink composition.

Colorants

The ink composition of the embodiment may include a colorant. The colorant may exhibit any of a color, black, white, and fluorescence. Among these colorants, the ink composition of the embodiment preferably includes a colored colorant to further remarkably obtain the effects of the present disclosure.

The colorant may be any of pigments and dyes. The pigments may be inorganic pigments or organic pigments.

The pigment of the embodiment is not particularly limited, and further specific examples are as follows.

Examples of carbon black used for black ink include, but not particularly limited to, "No. 2300", "No. 900", "MCF 88", "No. 33", "No. 40", "No. 45", "No. 52", "MA 7", "MA 8", "MA 100", "No. 2200B" (all from Mitsubishi Chemical Corporation); "Raven" series "5750", "5250", "5000", "3500", "1255", "700" (all from Columbian Carbon Company); "Regal" series "400R", "330R", "660R" (all from Cabot Corporation); "Mogul L" (from Cabot Corporation); "Monarch" series "700", "800", "880", "900", "1000", "1100", "1300", "1400" (all from Cabot Corporation); "Color Black" series "FW 1", "FW 2", "FW 2V", "FW 18", "FW 200", "S 150", "S 160", "S 170" (all from Degussa AG); "Printex" series "35", "U", "V", "140U" (all from Degussa AG); and "Special Black" series "6", "5", "4A", and "4" (all from Degussa AG).

Exemplary pigments used for white ink include, but not particularly limited to, C.I. Pigment White 6, 18, and 21; titanium oxide; zinc oxide; zinc sulfide; antimony oxide; zirconium oxide; and white hollow resin particles and polymer particles.

Exemplary pigments used for yellow ink includes, but not particularly limited to, C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Exemplary pigments used for magenta ink include, but not particularly limited to, C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:5, 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violet 19, 23, 32, 33, 36, 38, 43, and 50.

Exemplary pigments used for cyan ink include, but not particularly limited to, C.I. Pigment Blue 1, 2, 3, 15, 15:1, 15:2, 15:3, 15:34, 15:4, 16, 18, 22, 25, 60, 65, and 66; and C.I. Vat Blue 4 and 60.

Further, examples of pigments other than the above-described pigments include, but not particularly limited to, C.I. Pigment Green 7 and 10; C.I. Pigment Brown 3, 5, 25, and 26; and C.I. Pigment Orange 1, 2, 5, 7, 13, 14, 15, 16, 24, 34, 36, 38, 40, 43, and 63.

The average particle size of a pigment is preferably 50 nm or more and 300 nm or less, more preferably 55 nm or more and 200 nm or less, further preferably 60 nm or more and 150 nm or less, and still further preferably 65 nm or more and 100 nm or less. The average particle size herein is a volume-based particle size unless otherwise indicated. The measuring method may be performed, for example, by using a particle size distribution measuring apparatus based on a laser diffraction/scattering method as the measurement principle. Exemplary particle size distribution measuring apparatus includes a "Microtrac UPA" particle size measurement instrument (from Nikkiso Co., Ltd.) based on a dynamic light scattering method as the measurement principle.

When the ink composition of the embodiment includes a colorant, the content is preferably 1.00% by mass or more and 25.00% by mass or less, more preferably 1.50% by mass or more and 20.00% by mass or less, and further preferably 2.00% by mass or more and 15.00% by mass or less, relative to the total mass of the ink composition.

Dispersants

When the ink composition includes a pigment, a dispersant may also be included to improve dispersibility of the pigment in the ink composition. Exemplary dispersants include, but not particularly limited to, polymer dispersants. Examples of the polymer dispersants include, but not particularly limited to, propoxylated ethylenediamine, vinyl polymers, acrylic polymers, polyesters, polyamides, polyimides, polyurethanes, amino polymers, silicon-containing polymers, sulfur-containing polymers, fluorine-containing polymers, and epoxy resins.

Exemplary commercial products of the polymer dispersants include "Ajisper" series (from Ajinomoto Fine-Techno Co., Ltd.), "Solsperse" series, such as "36000" (from Lubrizol Corporation), "Disperbyk" series (from BYK Additives & Instruments), and "Disparlon" series (from Kusumoto Chemicals, Ltd.).

When the ink composition of the embodiment includes a dispersant, the content is preferably 0.10% by mass or more and 5.00% by mass or less, more preferably 0.10% by mass or more and 3.00% by mass or less, and further preferably 0.20% by mass or more and 1.00% by mass or less, relative to the total mass of the ink composition.

—Surfactants—

The ink composition of the embodiment may include a surfactant to enhance scratch resistance.

Exemplary surfactants include, but not particularly limited to, silicone surfactants. Examples of the silicone surfactants include, but not particularly limited to, polyether-modified silicones, such as polyether-modified polydimethylsiloxane, and polyester-modified silicones, such as polyester-modified polydimethylsiloxane.

Exemplary commercial products of the silicone surfactants include "BYK-347", "BYK-348", "BYK-UV 3500", "BYK-UV 3510", "BYK-UV 3530", and "BYK-UV 3570" (all from BYK Japan KK).

When the ink composition of the embodiment includes a surfactant, the content is preferably 0.10% by mass or more and 5.00% by mass or less, more preferably 0.20% by mass or more and 3.00% by mass or less, and further preferably 0.30% by mass or more and 1.00% by mass or less, relative to the total mass of the ink composition.

Polymerization Inhibitors

The ink composition of the embodiment may include a polymerization inhibitor.

Exemplary polymerization inhibitors include, but not particularly limited to, phenolic compounds, quinone compounds, amine compounds, nitro compounds, oxime compounds, and sulfur compounds.

Examples of the phenolic compounds include, but not particularly limited to, p-methoxyphenol, cresol, tert-butylcatechol, di-tert-butyl-p-cresol, α-naphthol, 3,5-di-tert-butyl-4-hydroxytoluene, 2,2'-methylenebis(4-methyl-6-tert-butylphenol), 2,2'-methylenebis(4-ethyl-6-tert-butylphenol), and 4,4'-thiobis(3-methyl-6-tert-butylphenol).

Examples of the quinone compounds include, but not particularly limited to, p-benzoquinone, anthraquinone, naphthoquinone, phenanthraquinone, p-xyloquinone, p-toluquinone, 2,6-dichloroquinone, 2,5-diphenyl-p-benzoquinone, 2,5-diacetoxy-p-benzoquinone, 2,5-dicaproxy-p-benzoquinone, 2,5-diacyloxy-p-benzoquinone, hydroquinone, 2,5-dibutylhydroquinone, mono-tert-butylhydroquinone, monomethylhydroquinone, and 2,5-di-tert-amylhydroquinone.

Examples of the amine compounds include, but not particularly limited to, N-phenyl-2-naphthylamine, p-(benzylamino)phenol, N,N'-di-2-naphthyl-p-phenylenediamine, N,N-dibenzylhydroxylamine, N-phenylhydroxylamine, N,N-diethylhydroxylamine, a compound having a 2,2,6,6-tetramethylpiperidine N-oxyl skeleton, a compound having a 2,2,6,6-tetramethylpiperidine skeleton, a compound having a 2,2,6,6-tetramethylpiperidine-N-alkyl skeleton, and a compound having a 2,2,6,6-tetramethylpiperidine-N-acyl skeleton.

Examples of the nitro compounds include, but not particularly limited to, dinitrobenzene, trinitrotoluene, and picric acid. Examples of the oxime compounds include, but not particularly limited to, quinone dioxime and cyclohexanone oxime. Examples of the sulfur compounds include, but not particularly limited to, phenothiazine.

These polymerization inhibitors may be used alone or in combination.

Among these polymerization inhibitors, a phenolic compound and an amine compound are preferably used in combination to suppress polymerization of monomers under both low-oxygen conditions and oxygen-present conditions. More preferably, p-methoxyphenol and a compound having a 2,2,6,6-tetramethylpiperidine N-oxyl skeleton are used in combination.

When the ink composition of the embodiment includes a polymerization inhibitor, the content is preferably 0.01% by mass or more and 5.00% by mass or less, more preferably 0.05% by mass or more and 3.00% by mass or less, and further preferably 0.10% by mass or more and 1.00% by mass or less, relative to the total mass of the ink composition.

Other Additives

The ink composition of the embodiment may include components other than those described above. Examples of such components include, but not particularly limited to, polymerization accelerators, penetration enhancers, humectants, fixing agents, antimicrobial agents, preservatives, antioxidants, UV absorbers, chelating agents, pH adjusters, and thickeners.

The ink composition of the embodiment can be prepared by mixing the above-described components in any order and, as necessary, by removing impurities and extraneous materials through filtration or the like. As the mixing method for the respective components, a method of successively adding materials to a vessel equipped with a stirrer, such as a mechanical stirrer or a magnetic stirrer, followed by stirring and mixing is employed. As the filtration method, centrifugal filtration, filter filtration, or the like can be employed.

The viscosity at 25° C. of the ink composition is preferably less than 25 mPa·s and more preferably 5 mPa·s or more and less than 20 mPa·s. By controlling the viscosity of the ink composition within the above-mentioned ranges, solubility of a photopolymerization initiator and other additives is enhanced and discharge stability during ink jet recording is readily achieved.

The viscosity is a value measured at 25° C. and a rotation rate of 10 rpm by using a DVM-E model rotational viscometer (from Tokyo Keiki Inc.) and a DVM-E model cone with a cone angle of 1°34' and a cone radius of 2.4 cm.

Ink Jet Recording Method

The ink composition of the embodiment is used for an ink jet recording method.

An ink jet recording method of an embodiment includes: a discharge step of discharging the ink composition of the above-described embodiment onto a recording medium from a head; and a curing step of curing the ink composition attached to the recording medium by irradiating with UV from a UV light-emitting diode having a peak wavelength within a range of 360 nm to 420 nm.

The ink jet recording method is a recording method in which an ink jet apparatus is filled with ink compositions for use. Exemplary ink jet apparatus includes, but not particularly limited to, a drop-on-demand ink jet apparatus. Such drop-on-demand ink jet apparatus encompasses: an apparatus that adopts an ink jet printing method using piezoelectric elements arranged in a head; and an apparatus that adopts an ink jet recording method using thermal energy from a heater or the like of heat-generating resistance elements arranged in a head, for example. An apparatus that adopts either of these ink jet recording methods may be used. Hereinafter, each step of the ink jet recording method will be described in detail.

Discharge Step

In the discharge step of the embodiment, for example, an ink composition is discharged in an ink jet mode onto the surface (image forming region) of a recording medium and attached to the recording medium, thereby forming an image. Here, discharge conditions may be appropriately determined depending on the physical properties of an ink composition to be discharged.

Recording Media

Examples of recording media include, but not particularly limited to, absorbent or non-absorbent recording media.

Examples of the absorbent recording media include, but not particularly limited to, plain paper, such as electrophotographic paper; ink jet paper; and art paper, coated paper, and cast coated paper used for common offset printing. Specifically, the ink jet paper herein is regarded as paper exclusively for ink jet that has an ink absorbing layer formed from silica particles and/or alumina particles or an ink absorbing layer formed from a hydrophilic polymer, such as polyvinyl alcohol or polyvinylpyrrolidone.

Examples of the non-absorbent recording media include, but not particularly limited to, films or plates of plastics, such as polyvinyl chloride (hereinafter, also referred to as "PVC"), polyethylene, polypropylene, and polyethylene terephthalate; plates of metals, such as iron, silver, copper, and aluminum; metal plates or plastic films manufactured by vapor deposition of such various metals; and plates of alloys, such as stainless steel and brass.

Among these recording media, non-absorbent recording media are preferable, plastic films are more preferable, and PVC films are further preferable.

Curing Step

In this step, the ink composition attached to a recording medium is cured by irradiating with UV from a UV light-emitting diode having a peak wavelength within a range of 360 nm or more and 420 nm or less.

The UV source used in the curing step is a UV light-emitting diode (hereinafter, also referred to as "UV-LED") due to the small size, long lifetime, high efficiency, and low cost. Since the ink composition of the embodiment has excellent curing properties, a tack-free cured film is obtained for a short time in the curing step even when a UV-LED is used as a UV source.

The emission peak wavelength of an irradiation source is preferably within the range of 360 nm or more and 420 nm or less and more preferably within the range of 380 nm or more and 400 nm or less. Moreover, the irradiation energy is preferably 50 mJ/cm$^2$ or more and 1,000 mJ/cm$^2$ or less and more preferably 300 mJ/cm$^2$ or more and 800 mJ/cm$^2$ or less.

The irradiation intensity is preferably set to 400 mW/cm$^2$ or more and 1,000 mW/cm$^2$ or less. The ink composition of the embodiment is an ink composition that can achieve excellent curing properties even when used for a curing step at the above-mentioned irradiation intensity.

The ink jet recording method of the embodiment may further include a publicly known step of a conventional ink jet recording method, in addition to the above-described each step.

Recorded Articles

A recorded article of an embodiment has been recorded by the above-described ink jet recording method. An image recorded on a recording medium is formed with the above-described radiation-curable ink composition and thus has excellent flexibility.

The uses of the recorded article of the embodiment include, but not particularly limited to, the use as an image recorded on the above-described recording medium. Such an image recorded on a recording medium has excellent flexibility and is thus especially suitable for the uses to be bonded to articles for which bending or stretching processability is required.

According to the embodiments, it is possible to provide a UV-curable ink jet ink composition having low viscosity, excellent curing properties, adhesion, stretch resistance, solubility of polymerization initiators as well as suppressed bleeding out after curing; and to provide an ink jet recording method.

EXAMPLES

Hereinafter, the present disclosure will be described further specifically by means of Examples and Comparative Examples. The present disclosure, however, is by no means limited by the following Examples.

Examples 1 to 16 and Comparative Examples 1 to 10

Preparation of Ink Compositions

Each ink composition was obtained by mixing, in the composition shown in the following Table 1, the respective materials and stirring sufficiently. Specifically, each ink composition was prepared by uniformly mixing the respective materials and removing insoluble matter through a membrane filter having a pore size of 5 µm. The resulting ink compositions were assessed by the evaluation methods described hereinafter.

Ink Jet Recording Method

Each nozzle row of a "PX-G 5000" ink jet printer (product name from Seiko Epson Corporation) was filled with an ink composition. Under normal temperature and normal pressure conditions, a solid pattern image was printed in a 4-pass mode at a recording resolution of 720 dpi×720 dpi and a droplet weight of 7 ng on a "Viewcal 2000 (white)" polyvinyl chloride sheet (product name from Sakurai Co., Ltd.) as a recording medium. Here, the solid pattern image is an image in which dots are recorded in all the pixels, which are the smallest recording unit regions defined by the recording resolution. Simultaneously with the printing, the solid pattern image was cured by irradiating with 395 nm UV, from a UV-LED within a UV irradiation device mounted next to a carriage, at a total irradiation energy for 4 passes of 800 mJ/cm². Through the above procedure, a recorded article in which a cured film had been attached to the recording medium was obtained. Here, it was considered that an image has been cured when the tackiness of the image (coating film surface) is lost in a finger touch test.

Evaluation Methods

Viscosity

Each ink composition was measured for viscosity at 25° C. by using a DVM-E model rotational viscometer (from Tokyo Keiki Inc.). A DVM-E model cone with a cone angle of 1°34' and a cone radius of 2.4 cm was used as a rotor. The rotation rate was set to 10 rpm.

Here, the evaluation criteria are classified as follows.
A: less than 20 mPa·s
B: 20 mPa·s or more and less than 25 mPa·s
C: 25 mPa·s or more Curing Properties The curing properties were evaluated by applying, with a bar coater, each of the ink compositions to a polyethylene terephthalate (PET) film at a coating film thickness before drying of 12 µm; irradiating the coating film with a UV-LED lamp; measuring a tack-free time; and calculating a UV irradiation energy required for curing. The irradiation energy [mJ/cm²] was obtained by measuring an irradiation intensity [mW/cm²] on a surface irradiated with UV from a light source and multiplying the irradiation intensity by an irradiation duration [s]. The irradiation intensity was measured by using a "UM-10" UV meter and a "UM-400" light receiver (product names both from Konica Minolta Sensing, Inc.).

Here, the evaluation criteria are classified as follows.
AA: less than 200 mJ/cm²
A: 200 mJ/cm² or more and less than 400 mJ/cm²
B: 400 mJ/cm² or more and less than 800 mJ/cm²
C: 800 mJ/cm² or more Adhesion A cutter blade was set perpendicular to an image of each recorded article obtained, 6 cuts (interval between cuts: 1 mm, the same holds true hereinafter) were made on the image. After the 6 cuts were formed, the orientation of the image was changed by 90°, and additional 6 cuts orthogonal to the already formed cuts were made, thereby forming lattice cuts.

Subsequently, an about 75 mm-length transparent bonding tape (width of 25±1 mm) was bonded to the lattice cuts formed on an image and sufficiently rubbed with a finger such that the image becomes visible therethrough. Within 5 minutes after bonding of the tape, the tape was completely peeled off from the image at an angle near 60° in 0.5 to 1.0 second, and the resulting state of the image was visually observed.

Here, the evaluation criteria are classified as follows.
AA: no peeling of cured film observed or peeling observed for 1% or less of lattice
A: peeling of cured film observed for more than 1% and 5% or less of lattice
B: peeling of cured film observed for more than 5% and 35% or less of lattice
C: peeling of cured film observed for more than 35% of lattice Stretch Resistance Each recorded article was cut into a predetermined size (length here is designated as L0) and set in a tensile tester (from A & D Company, Ltd.). The tensile rate of the tensile tester was set to 100 mm/min, and the recorded article was pulled by the tensile tester and visually observed for the moment when cracking or peeling occurred in the cured film of the recorded article. The length of the pulled recorded article was calculated from the time between the start of pulling to the occurrence of cracking or the like and was designated as L1. From the following formula (1), elongation (%) at the occurrence of cracking or the like of the cured film (image) formed on a recording medium was calculated, and flexibility of the cured film of the recorded article was evaluated.

$$\text{Elongation of a cured film at the occurrence of cracking or the like (\%)} = [(L1-L0)/L0] \times 100 \quad (1)$$

Here, the evaluation criteria are classified as follows.
AA: elongation at the occurrence of cracking or the like of 300% or more
A: elongation at the occurrence of cracking or the like of 200% or more and less than 300%
B: elongation at the occurrence of cracking or the like of 100% or more and less than 200%
C: elongation at the occurrence of cracking or the like of less than 100%

Solubility of Polymerization Initiators

All of the respective monomer components according to each Example or Comparative Example shown in Table 1 were weighed, fed into a vessel, mixed, and then added with a polymerization initiator shown in Table 1 to yield a mixture. The mixture was stirred with a stirrer at a rotation number of 300 rpm in a room temperature environment, and the time until the polymerization initiator is completely dissolved to become clear was measured. When the polymerization initiator did not dissolve after stirring for 1 hour, the vessel was set in an ultrasonic cleaner and treated with ultrasound for 15 minutes. After ultrasonic treatment, whether a polymerization initiator was dissolved or not was observed again, and this was regarded as an indicator of solubility.

Here, the evaluation criteria are classified as follows.
A: dissolution within 1 hour
B: dissolution after ultrasonic treatment
C: no dissolution even after ultrasonic treatment Bleeding Out after Curing The presence or absence of bleeding out of ink composition components on the surface of a cured film obtained in each Example and Comparative Example was confirmed by the following method.

A sample was prepared by printing a solid pattern with an ink jet printer and cut into a 3 cm×3 cm square. The cut sample was placed in a glass Petri dish, stored in an oven at 50° C. for 2 days or 7 days, and taken out. The sample in the Petri dish was then cooled to room temperature. Subsequently, the printed surface was observed at a magnification of 500× under a "VHX-900" digital microscope (product name from Keyence Corporation).

Here, the evaluation criteria are classified as follows.
A: no visible extraneous material or precipitate due to bleeding out on the surface of a sample stored for 7 days
B: no visible extraneous material or precipitate for a sample stored for 2 days, but visible extraneous material or precipitate for a sample stored for 7 days
C: visible extraneous material or precipitate even for a sample stored for 2 days

TABLE 1

|  |  |  | Ex. 1 | Ex. 2 | Ex. 3 | Ex. 4 | Ex. 5 | Ex. 6 |
|---|---|---|---|---|---|---|---|---|
| Composition (mass %) | Pigment | P.B. 15:3 | 2.50 | 2.50 | 2.50 | 2.50 | 2.50 | 2.50 |
|  | Dispersant |  | 1.50 | 1.50 | 1.50 | 1.50 | 1.50 | 1.50 |
|  | Compound (A1) | VEEA | 51.00 | 51.00 | 51.00 | 51.00 | 41.00 | 41.00 |
|  | Reference monomer | DPGDA |  |  |  |  |  |  |
|  | Cyclic monofunctional | IBXA | 39.00 |  |  |  |  |  |
|  | monomer (A2) | THFA |  | 39.00 |  |  |  |  |
|  |  | CTFA |  |  | 40.00 |  | 30.00 | 30.00 |
|  |  | TMCHA |  |  |  | 40.00 |  |  |
|  | Hydroxy group-containing | 4-HBA |  |  |  |  | 20.00 |  |
|  | monomer (A3) | 4-HPA |  |  |  |  |  | 20.00 |
|  | Urethane (meth)acrylate oligomer | CN9893 |  |  |  |  |  |  |
|  | Fluorescent brightener | Compound (b1) | 0.30 | 0.30 | 0.30 | 0.30 | 0.30 | 0.30 |
|  |  | Compound (b2) |  |  |  |  |  |  |
|  |  | Compound (b3) |  |  |  |  |  |  |
|  |  | Compound (b4) |  |  |  |  |  |  |
|  | Polymerization initiator | Omnirad 819 |  |  | 4.00 | 4.00 | 4.00 | 4.00 |
|  |  | SpeedCure TPO | 3.00 | 3.00 |  |  |  |  |
|  |  |  | 2.00 | 2.00 |  |  |  |  |
|  | Sensitizer | Omnipol TX |  |  |  |  |  |  |
|  |  | SpeedCure 7010 |  |  |  |  |  |  |
|  | Surfactant | BYK-UV3500 | 0.50 | 0.50 | 0.50 | 0.50 | 0.50 | 0.50 |
|  | Polymerization inhibitor | LA-7RD | 0.05 | 0.05 | 0.05 | 0.05 | 0.05 | 0.05 |
|  |  | MEHQ | 0.15 | 0.15 | 0.15 | 0.15 | 0.15 | 0.15 |
| Evaluation | Viscosity |  | A | A | A | A | A | A |
|  | Curing properties |  | A | A | A | A | AA | AA |
|  | Adhesion |  | A | A | A | A | A | A |
|  | Stretch resistance |  | A | A | A | A | A | A |
|  | Solubility of polymerization initiator |  | A | A | A | A | A | A |
|  | Bleeding out after curing |  | A | A | A | A | A | A |

|  |  |  | Ex. 7 | Ex. 8 | Ex. 9 | Ex. 10 | Ex. 11 |
|---|---|---|---|---|---|---|---|
| Composition (mass %) | Pigment | P.B. 15:3 | 2.50 | 2.50 | 2.50 | 2.50 | 2.50 |
|  | Dispersant |  | 1.50 | 1.50 | 1.50 | 1.50 | 1.50 |
|  | Compound (A1) | VEEA | 41.00 | 51.00 | 51.00 | 51.00 | 49.00 |
|  | Reference monomer | DPGDA |  |  |  |  |  |
|  | Cyclic monofunctional | IBXA |  | 40.00 | 40.00 | 40.00 | 40.00 |
|  | monomer (A2) | THFA |  |  |  |  |  |
|  |  | CTFA | 30.00 |  |  |  |  |
|  |  | TMCHA |  |  |  |  |  |
|  | Hydroxy group-containing | 4-HBA | 15.00 |  |  |  |  |
|  | monomer (A3) | 4-HPA |  |  |  |  |  |
|  | Urethane (meth)acrylate oligomer | CN9893 | 5.00 |  |  |  |  |
|  | Fluorescent brightener | Compound (b1) | 0.30 |  |  |  | 0.30 |
|  |  | Compound (b2) |  | 0.30 |  |  |  |
|  |  | Compound (b3) |  |  | 0.30 |  |  |
|  |  | Compound (b4) |  |  |  | 0.30 |  |
|  | Polymerization initiator | Omnirad 819 | 4.00 | 4.00 | 4.00 | 4.00 | 4.00 |
|  |  | SpeedCure TPO |  |  |  |  |  |
|  | Sensitizer | Omnipol TX |  |  |  |  | 2.00 |
|  |  | SpeedCure 7010 |  |  |  |  |  |
|  | Surfactant | BYK-UV3500 | 0.50 | 0.50 | 0.50 | 0.50 | 0.50 |
|  | Polymerization inhibitor | LA-7RD | 0.05 | 0.05 | 0.05 | 0.05 | 0.05 |
|  |  | MEHQ | 0.15 | 0.15 | 0.15 | 0.15 | 0.15 |
| Evaluation | Viscosity |  | A | A | A | A | A |
|  | Curing properties |  | AA | A | A | A | AA |
|  | Adhesion |  | AA | A | A | A | A |
|  | Stretch resistance |  | A | A | A | A | A |
|  | Solubility of polymerization initiator |  | A | A | A | A | A |

TABLE 1-continued

|  |  |  | Ex. 12 | Ex. 13 | Ex. 14 | Ex. 15 | Ex. 16 |
|---|---|---|---|---|---|---|---|
|  | Bleeding out after curing |  | A | A | A | A | A |
| Composition (mass %) | Pigment | P.B. 15:3 | 2.50 | 2.50 | 2.50 | 2.50 | 2.50 |
|  | Dispersant |  | 1.50 | 1.50 | 1.50 | 1.50 | 1.50 |
|  | Compound (A1) | VEEA | 49.00 | 10.00 | 55.00 | 55.00 | 41.00 |
|  | Reference monomer | DPGDA |  |  |  |  |  |
|  | Cyclic monofunctional monomer (A2) | IBXA | 40.00 | 50.00 | 30.00 | 10.00 | 50.00 |
|  |  | THFA |  |  |  |  |  |
|  |  | CTFA |  |  |  |  |  |
|  |  | TMCHA |  |  |  |  |  |
|  | Hydroxy group-containing monomer (A3) | 4-HBA |  | 31.00 | 6.00 |  |  |
|  |  | 4-HPA |  |  |  | 26.00 |  |
|  | Urethane (meth)acrylate oligomer | CN9893 |  |  |  |  |  |
|  | Fluorescent brightener | Compound (b1) | 0.30 | 0.30 | 0.30 | 0.30 | 0.30 |
|  |  | Compound (b2) |  |  |  |  |  |
|  |  | Compound (b3) |  |  |  |  |  |
|  |  | Compound (b4) |  |  |  |  |  |
|  | Polymerization initiator | Omnirad 819 | 4.00 | 4.00 | 4.00 | 4.00 | 4.00 |
|  |  | SpeedCure TPO |  |  |  |  |  |
|  | Sensitizer | Omnipol TX |  |  |  |  |  |
|  |  | SpeedCure 7010 | 2.00 |  |  |  |  |
|  | Surfactant | BYK-UV3500 | 0.50 | 0.50 | 0.50 | 0.50 | 0.50 |
|  | Polymerization inhibitor | LA-7RD | 0.05 | 0.05 | 0.05 | 0.05 | 0.05 |
|  |  | MEHQ | 0.15 | 0.15 | 0.15 | 0.15 | 0.15 |
| Evaluation | Viscosity |  | A | B | A | A | A |
|  | Curing properties |  | AA | B | A | A | A |
|  | Adhesion |  | A | A | A | A | A |
|  | Stretch resistance |  | A | A | B | B | AA |
|  | Solubility of polymerization initiator |  | A | B | A | A | A |
|  | Bleeding out after curing |  | A | A | A | A | A |

|  |  |  | Comp. Ex. 1 | Comp. Ex. 2 | Comp. Ex. 3 | Comp. Ex. 4 | Comp. Ex. 5 |
|---|---|---|---|---|---|---|---|
| Composition (mass %) | Pigment | P.B. 15:3 | 2.50 | 2.50 | 2.50 | 2.50 | 2.50 |
|  | Dispersant |  | 1.50 | 1.50 | 1.50 | 1.50 | 1.50 |
|  | Compound (A1) | VEEA | 51.30 | 51.29 | 50.75 |  | 61.00 |
|  | Reference monomer | DPGDA |  |  |  | 51.00 |  |
|  | Cyclic monofunctional monomer (A2) | IBXA | 40.00 | 40.00 | 40.00 | 40.00 | 30.00 |
|  |  | THFA |  |  |  |  |  |
|  |  | CTFA |  |  |  |  |  |
|  |  | TMCHA |  |  |  |  |  |
|  | Hydroxy group-containing monomer (A3) | 4-HBA |  |  |  |  |  |
|  |  | 4-HPA |  |  |  |  |  |
|  | Urethane (meth)acrylate oligomer | CN9893 |  |  |  |  |  |
|  | Fluorescent brightener | Compound (b1) |  | 0.01 | 0.55 | 0.30 | 0.30 |
|  |  | Compound (b2) |  |  |  |  |  |
|  |  | Compound (b3) |  |  |  |  |  |
|  |  | Compound (b4) |  |  |  |  |  |
|  | Polymerization initiator | Omnirad 819 | 4.00 | 4.00 | 4.00 | 4.00 | 4.00 |
|  |  | SpeedCure TPO |  |  |  |  |  |
|  | Sensitizer | Omnipol TX |  |  |  |  |  |
|  |  | SpeedCure 7010 |  |  |  |  |  |
|  | Surfactant | BYK-UV3500 | 0.50 | 0.50 | 0.50 | 0.50 | 0.50 |
|  | Polymerization inhibitor | LA-7RD | 0.05 | 0.05 | 0.05 | 0.05 | 0.05 |
|  |  | MEHQ | 0.15 | 0.15 | 0.15 | 0.15 | 0.15 |
| Evaluation | Viscosity |  | A | A | A | C | A |
|  | Curing properties |  | D | C | A | A | A |
|  | Adhesion |  | A | A | A | A | A |
|  | Stretch resistance |  | A | A | A | A | C |
|  | Solubility of polymerization initiator |  | A | A | A | A | A |
|  | Bleeding out after curing |  | A | A | C | B | A |

|  |  |  | Comp. Ex. 6 | Comp. Ex. 7 | Comp. Ex. 8 | Comp. Ex. 9 | Comp. Ex. 10 |
|---|---|---|---|---|---|---|---|
| Composition (mass %) | Pigment | P.B. 15:3 | 2.50 | 2.50 | 2.50 | 2.50 | 2.50 |
|  | Dispersant |  | 1.50 | 1.50 | 1.50 | 1.50 | 1.50 |
|  | Compound (A1) | VEEA | 52.50 | 46.50 | 51.00 | 51.00 | 16.00 |
|  | Reference monomer | DPGDA |  |  | 40.00 | 35.00 |  |
|  | Cyclic monofunctional monomer (A2) | IBXA | 40.00 | 40.00 |  | 5.00 | 60.00 |
|  |  | THFA |  |  |  |  |  |
|  |  | CTFA |  |  |  |  |  |
|  |  | TMCHA |  |  |  |  |  |
|  | Hydroxy group-containing monomer (A3) | 4-HBA |  |  |  |  |  |
|  |  | 4-HPA |  |  |  |  |  |

TABLE 1-continued

| | | | | | | | |
|---|---|---|---|---|---|---|---|
| | Urethane (meth)acrylate oligomer | CN9893 | | | | | |
| | Fluorescent brightener | Compound (b1) | 0.30 | 0.30 | 0.30 | 0.30 | 0.30 |
| | | Compound (b2) | | | | | |
| | | Compound (b3) | | | | | |
| | | Compound (b4) | | | | | |
| | Polymerization initiator | Omnirad 819 | 2.50 | 8.50 | 4.00 | 4.00 | 4.00 |
| | | SpeedCure TPO | | | | | |
| | Sensitizer | Omnipol TX | | | | | |
| | | SpeedCure 7010 | | | | | |
| | Surfactant | BYK-UV3500 | 0.50 | 0.50 | 0.50 | 0.50 | 0.50 |
| | Polymerization inhibitor | LA-7RD | 0.05 | 0.05 | 0.05 | 0.05 | 0.05 |
| | | MEHQ | 0.15 | 0.15 | 0.15 | 0.15 | 0.15 |
| Evaluation | Viscosity | | A | A | A | A | B |
| | Curing properties | | C | A | A | A | B |
| | Adhesion | | A | A | B | B | C |
| | Stretch resistance | | A | A | C | C | A |
| | Solubility of polymerization initiator | | A | C | A | A | B |
| | Bleeding out after curing | | A | A | A | A | A |

The various abbreviations in Table 1 will be described below.
—Compound (A1)—
VEEA: 2-(2-vinyloxyethoxy)ethyl acrylate (product name "VEEA-AI" from Nippon Shokubai Co., Ltd.)
—Reference Monomer—
DPGDA: dipropylene glycol diacrylate (product name "SR 508" from Sartomer)
—Cyclic Monofunctional Monomers (A2)—
IBXA: isobornyl acrylate (from Osaka Organic Chemical Industry Ltd.)
THFA: tetrahydrofurfuryl acrylate (product name "Viscoat #150" from Osaka Organic Chemical Industry Ltd.)
CTFA: cyclic trimethylolpropane formal acrylate (product name "Viscoat #200" from Osaka Organic Chemical Industry Ltd.)
TMCHA: 3,3,5-trimethylcyclohexyl acrylate (product name "CD 420" from Sartomer)
—Hydroxy Group-Containing Monomers (A3)—
4-HBA: 4-hydroxybutyl acrylate (from Osaka Organic Chemical Industry Ltd.)
3-HPA: 3-hydroxypropyl acrylate (product name "Light Acrylate HOP-A" from Kyoeisha Chemical Co., Ltd.)
—Aliphatic Urethane Acrylate Oligomer—
CN 9893: difunctional aliphatic urethane acrylate (product name "CN 9893" from Sartomer)
—Polymerization Initiators—
Omnirad 819: bis(2,4,6-trimethylbenzoyl)phenylphosphine oxide (product name from IGM Resins B.V.)
SpeedCure TPO: (2,4,6-trimethylbenzoyl)diphenylphosphine oxide (product name from Lambson Ltd.)
—Sensitizers—
Omnipol TX: diester of polytetramethylene glycol with carboxymethoxythioxanthone (product name from IGM Resins B.V., molecular weight of 790)
SpeedCure 7010: 1,3-di({α-[1-chloro-9-oxo-9H-thioxanthen-4-yl]oxy}acetylpoly[oxy(1-methylethylene)]oxy]-2,2-bis({α-[1-chloro-9-oxo-9H-thioxanthen-4-yl]oxy}acetylpoly[oxy(1-methylethylene)]oxymethyl)propane (CAS No. 1003567-83-6) (product name from Lambson Ltd., molecular weight of 1,839)
—Others—
BYK-UV 3500: silicone surfactant (product name "BYK-UV 3500" from BYK Japan KK)
LA-7RD: compound having 2,2,6,6-tetramethylpiperidine 1-oxyl skeleton (product name "LA-7RD" from Adeka Corporation)

MEHQ: p-methoxyphenol
P.B. 15:3: C.I. Pigment Blue 15:3

As in the foregoing, the comparison among the results of Examples and Comparative Examples reveals that an ink composition of the embodiment has low viscosity, excellent curing properties, adhesion, stretch resistance, solubility of polymerization initiators, and suppressed bleeding out after curing.

The comparison between the results of Example 1 and Comparative Examples 1 and 2 reveals that an ink composition exhibits excellent curing properties and suppressed bleeding out after curing by including a predetermined amount of a specific fluorescent brightener.

From the results of Examples 1 and 8 to 10, an ink composition is found to have low viscosity, excellent curing properties, adhesion, stretch resistance, solubility of polymerization initiators, and suppressed bleeding out after curing when any of compound (b1), (b2), (b3), and (b4) is used.

The comparison between the results of Example 1 and Comparative Example 4 reveals that an ink composition containing a compound (A1) has further low viscosity and suppressed bleeding out after curing, compared with a case in which another monomer is used.

The comparison between the results of Example 1 and Comparative Example 5 reveals that an ink composition exhibits excellent stretch resistance by including a predetermined amount of a compound (A1).

The comparison among the results of Examples 1, 13, and 14 reveals that an ink composition has low viscosity, excellent curing properties, adhesion, stretch resistance, solubility of polymerization initiators, and suppressed bleeding out after curing by including a predetermined amount of a compound (A1).

The comparison between the results of Example 1 and Comparative Example 8 reveals that an ink composition exhibits particularly excellent stretch resistance and enhanced adhesion by including an alicyclic monofunctional monomer (A2).

The comparison between the results of Example 1 and Comparative Example 9 reveals that an ink composition exhibits particularly excellent stretch resistance and enhanced adhesion by including a predetermined amount or more of an alicyclic monofunctional monomer (A2).

The comparison between the results of Example 1 and Comparative Example 10 reveals that an ink composition exhibits particularly excellent adhesion and improved low viscosity characteristics, curing properties, and solubility of polymerization initiators by including a predetermined amount or less of an alicyclic monofunctional monomer (A2).

The comparison among the results of Examples 1, 15, and 16 reveals that an ink composition has low viscosity, excellent curing properties, adhesion, stretch resistance, solubility of polymerization initiators, and suppressed bleeding out after curing when the content of an alicyclic monofunctional monomer (A2) falls within a predetermined range.

The comparison between the results of Examples 5 and 6 and Example 3 reveals that an ink composition exhibits particularly excellent curing properties by including a hydroxy group-containing monomer (A3).

The comparison between the results of Example 7 and Example 5 reveals that an ink composition exhibits particularly excellent curing properties and particularly excellent adhesion by including a urethane (meth)acrylate.

The comparison between the results of Example 1 and Examples 11 and 12 reveals that an ink composition exhibits particularly excellent curing properties by including a sensitizer having a molecular weight of 700 or more.

What is claimed is:

1. A UV-curable ink jet ink composition comprising:
   10.00% by mass or more and 60.00% by mass or less, relative to a total mass of the ink composition, of a compound represented by the following formula (A):

$$CH_2=CR^1-COOR^2-O-CH=CH-R^3 \qquad (A)$$

wherein $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms;
   10.00% by mass or more and 50.00% by mass or less, relative to the total mass of the ink composition, of one or more monofunctional monomers having an alicyclic hydrocarbon group or a cyclic ether group;
   0.05% by mass or more and 0.50% by mass or less, relative to the total mass of the ink composition, of one or more fluorescent brighteners including a compound represented by the following formula (b1), (b2), (b3), or (b4):

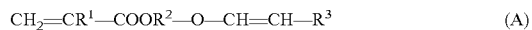

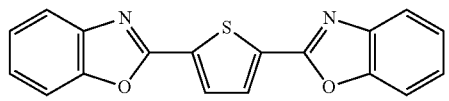

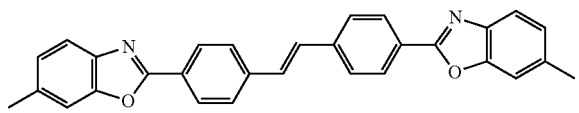

and
   3.50% by mass or more and 6.00% by mass or less, relative to the total mass of the ink composition, of one or more acylphosphine oxide polymerization initiators.

2. The UV-curable ink jet ink composition according to claim 1, wherein the monofunctional monomers having an alicyclic hydrocarbon group or a cyclic ether group include isobornyl (meth)acrylate, tetrahydrofurfuryl (meth)acrylate, cyclic trimethylolpropane formal (meth)acrylate, or 3,3,5-trimethylcyclohexyl (meth)acrylate.

3. The UV-curable ink jet ink composition according to claim 1, further comprising:
   5.00% by mass or more and 40.00% by mass or less, relative to the total mass of the ink composition, of a monomer having a hydroxy group.

4. The UV-curable ink jet ink composition according to claim 1, wherein the fluorescent brighteners include a compound represented by the formula (b1) or (b2).

5. The UV-curable ink jet ink composition according to claim 1, wherein the fluorescent brighteners include a compound represented by the formula (b1).

6. The UV-curable ink jet ink composition according to claim 1, wherein the acylphosphine oxide polymerization initiators include a bisacylphosphine oxide polymerization initiator.

7. The UV-curable ink jet ink composition according to claim 1, further comprising:
   3.00% by mass or more and 10.00% by mass or less, relative to the total mass of the ink composition, of a urethane (meth)acrylate oligomer.

8. The UV-curable ink jet ink composition according to claim 1, further comprising a colored colorant.

9. The UV-curable ink jet ink composition according to claim 1, further comprising a sensitizer having a molecular weight of 700 or more.

10. An ink jet recording method comprising:
    a discharge step of discharging the UV-curable ink jet ink composition according to claim 1 onto a recording medium from a head; and
    a curing step of curing the UV-curable ink jet ink composition attached to the recording medium by irradiating with UV from a UV light-emitting diode having a peak wavelength within a range of 360 nm or more and 420 nm or less.

* * * * *